United States Patent [19]

Popiolek

[11] 3,767,450

[45] Oct. 23, 1973

[54] METHOD OF MANUFACTURING HECTOGRAPHIC PAPER

[75] Inventor: Wladislas Popiolek, Harlow, England

[73] Assignee: Kores Manufacturing Company Limited, Harlow, Essex, England

[22] Filed: Oct. 6, 1971

[21] Appl. No.: 187,202

Related U.S. Application Data

[63] Continuation of Ser. No. 838,647, July 2, 1969, abandoned.

[52] U.S. Cl.............. 117/36.1, 117/36.2, 117/157, 117/158, 106/22, 106/26
[51] Int. Cl............................................. B41m 5/10
[58] Field of Search.................. 117/36.1, 36.2; 106/26

[56] References Cited
UNITED STATES PATENTS

| | | | |
|---|---|---|---|
| 3,036,924 | 5/1962 | Newman | 117/36.1 |
| 2,382,796 | 8/1945 | Knaggs | 106/26 |
| 2,382,861 | 8/1945 | Curado | 117/36.1 |
| 1,328,188 | 1/1920 | Ohashi | 117/36.1 |

Primary Examiner—Murray Katz
Attorney—Watson et al.

[57] ABSTRACT

The invention is concerned with hectographic paper. The paper is produced by coating a substrate with a dye composition prepared by contacting a dye with a volatile solvent to at least partially dissolve it and mixing the solution with a volatile non-solvent. In the solution any particles of undissolved dye must be 10 microns or less. After coating the volatile constituents are evaporated. The method can produce hectographic paper in which the coating comprises from 20 to 100 percent dye. Those with from 95 to 100 percent dye have not been prepared by previous methods.

8 Claims, No Drawings

METHOD OF MANUFACTURING HECTOGRAPHIC PAPER

This is a continuation of application Ser. No. 838,647, filed July 2, 1969, now abandoned.

The present invention relates to hectographic paper and to a method for the manufacture thereof.

It is well known that hectographic coatings can be, and in fact generally are, applied to substrates as molten compositions which are subsequently cooled to give solid transfer layers. These transfer layers may be overcoated with clean-to-handle protective layers which prevent the dye loaded transfer layers from soiling fingers, hands and so on when they are handled.

It is also well known to apply hectographic transfer compositions to substrates out of volatile organic liquids which themselves are not solvents or are only extremely poor solvents for the hectographic dyes or dye intermediates of the compositions. The volatile organic liquids are then evaporated off and the transfer coatings again may be overcoated with clean-to-handle protective coatings.

In both the aboeve-mentioned methods it is essential to grind thoroughly the transfer coating composition containing the particles of dye or dye intermediate before applying the composition to the substrate. The grinding methods used are numerous, for example, three roller mills, attritor mills, ball mills and sand mills, but always time consuming and costly. Also by these methods it has not been possible to produce hectographic papers having a hectographic coating comprising more than 90 percent by weight of dye or dye intermediate based on the non-volatile constituents of the coating.

We have now found, contrary to the generally held belief that any volatile oragnic liquid used in the production of hectographic coatings must be a non-solvent, or a very poor solvent for the dye or dye intermediate, that by using a good solvent for the dye or dye intermediate the above-mentioned essential grinding and its attendant cost and waste of time may be avoided.

In addition we have found that in this manner ther may be produced hectographic papers coated with up to 100 percent by weight of dye based on the non-volatile constituents of the coating.

Accordingly, the present invention provides a method of manufacturing a hectographic paper having a hectographic coating comprising from 20 to 100 percent by weight of dye or dye intermediate based on the non-volatile constituents of the coating, which method comprises contacting the dye or intermediate with a volatile solvent therefor such that the dye or intermediate is at least partially dissolved in the solvent and the particle size of undissolved dye is reduced to 10 microns or less, mixing the solution with a volatile non-solvent for the dye or intermediate, any other constituents of the coating being included in the solvent, in the non-solvent or in the mixture by subsequent addition, coating the mixture onto a substrate and removing volatile constituents from the coating.

The invention also provides a hectographic paper, which paper comprises a substrate having a hectographic coating comprising more than 90 percent by weight, preferably from 95 to 100 percent by weight, and more of a dye or dye intermediate based on the non-volatile constituents of the coating.

Since hectographic papers are usually used in spirit duplication it is convenient to use ethyl alcohol or a mixture thereof with water or Cellosolve (ethylene glycol monoethyl ether) as the solvent for the dye or intermediate, for example, when employing such hectographic dyes as methyl violet or malachite green. However, if desired, any other volatile solvent may be used, such as isopropyl alcohol, again, if desired in admixture with water or Cellosolve.

In addition where duplication is to be carried out with a solvent other than methylated spirits, e.g., with water containing a small amount of diethanolamine for hectographic papers based on diazo dyes, the solvent used in the method of the invention may be conveniently the solvent to be used for duplication.

Examples of useful dyes are methyl violet, ethyl violet and malachite green, and useful dye intermediates are the leuco forms of the aforementioned dyes.

In the method of the invention the dye or dye intermediate need not form an ideal solution or even be wholly dissolved in the solvent provided the dye agglomerates or particles are reduced to 10 microns or less, preferably 2 microns or less and the solution/dispersion is non-viscous and easily flowing. Dissolution and reduction in particle size may be achieved conveniently if necessary by fast stirring.

The dye solution is mixed, preferably whilst stirring efficiently, with a non-solvent for the dye, either by adding the dye solution to the non-solvent or vice versa, the latter being preferred.

The keying of the hectographic coating to the substrate depends on several variables, for example, on the substrate and, more important, on the relative amounts of solvent and non-solvent used, the greater the ratio of solvent to non-solvent the better the keying to the substrate. This is irrespective of whether any binders and/or plasticizers are present in the hectographic coating. By a suitable choice of dye solvent and non-solvent it is possible to produce a coating consisting of from 20 to 100 percent of dye or intermediate e.g., 50 to 60 percent, based on the non-volatile constituents of the coating and also, for example, to strike a good balance with regard to the keying of the coating to the substrate, for example, paper, film, pretreated paper or film or a laminate. The keying of the coating to the substrate must be adequate but not excessive if a good transferability of the coating is to be obtained during typing or printing.

If a binder is used it is generally dissolved in the non-solvent for the dye. The binder may be any of the waxes or polymers or mixtures of both used at present in the hectographic carbon field. Any plasticizers or softeners also are preferably dissolved in the non-solvent and again these are well known. Surface active agents when used may be included in either the solvent or the non-solvent as may also fillers. If fillers are used they must be easily dispersible in the solvent and/or non-solvent for the dye and have a maximum particle size of 10 microns or less.

The many reasons why binders, softeners, plasticizers, surface active agents and fillers are used in hectographic coatings are well known to those familiar with this field.

The hectographic coating may be applied to the substrate by any of the known methods including patch printing. The patch printing may be of the type which gives four clear unprinted margins thus making the hectographic paper cleaner to handle.

The hectographic coating is preferably overcoated with a clean-to-handle top coating, preferably based on a wax.

Following is a description by way of example of the manufacture of hectographic papers in accordance with the invention.

EXAMPLE 1

| Constituents | Parts by weight |
|---|---|
| Ethylhydroxyethylcellulose, low viscosity obtained from Hercules Powder Company | 7 |
| Arian 1237 mineral oil having a viscosity between one-half and 1 poise at 25°C. - obtained from Petrofina of Gt. Britain Ltd. | 14 |
| Zinc stearate CQ grade | 29 |
| Methyl violet 10BNS grade—I.C.I. | 50 |
| Methylated spirits | 80 |
| Toluol | 100 |

A hectographic paper coating composition containing the above constituents was formulated in the following manner:

The ethylhydroxyethylcellulose was dissolved in the toluol and the mineral oil stirred into the resulting solution. The zinc stearate was dissolved in the methylated spirits with warming and the solution cooled. The methyl violet was added to the cooled solution.

The toluol solution was then added to the methylated spirits solution whilst the latter was stirred with a fast stirrer.

The resulting coating composition was coated at 14 g/m² onto 25 g/m² oil resistant Karbalto Purple carbonising tissue and volatiles were removed. Finally the hectographic coating was coated with a protective layer of wax.

EXAMPLE 2

| Constituents | Parts by Weight |
|---|---|
| Ethylhydroxyethylcellulose as in Example 1 | 1 |
| Cardis 262-a hard oxidised microcrystalline wax obtained from Warwick Waxes | 14 |
| Arian 1237 | 19 |
| Vaseline | 6 |
| Methic Copying Black 2TF — obtained from I.C.I. | 60 |
| Methylated spirits 68 OP | 60 |
| Toluol | 120 |

A hectographic paper coating composition containing the above constituents was formulated in the following manner:

The copying black was dissolved in the methylated spirits at room temperature with fast stirring. The remaining constituents were heated together to form a solution, cooled and stirred. The latter solution was added to the methylated spirits solution, stirred and coated at 21 g/m² onto 25 g/m² oil resistant Karbalto Purple carbonising tissue and volatiles were removed. Finally the hectographic coating was coated with a protective layer of wax.

EXAMPLE 3

50 Parts by weight of methyl violet (10 BNS grade of I.C.I.) were dissolved in 90 parts by weight of isopropyl alcohol at room temperature with fast stirring. 10 Parts by weight of toluol were then stirred into the alcohol solution and the whole subjected to fast stirring.

The resulting coating composition was coated at 6 g/m² onto 25 g/m² oil resistant Karbalto Purple carbonising tissue and volatiles were removed. Finally the hectographic coating was coated with a protective layer of wax.

EXAMPLE 4

| Constituents | Parts by Weight |
|---|---|
| Isopropyl alcohol | 40 |
| Water | 2 |
| Methyl violet 10 BNS grade—ICI | 20 |
| Toluene | 4 |

A hectographic paper coating composition containing the above constituents was formulated in the following manner:

The isopropyl alcohol and water were mixed together and the methyl violet was dissolved in the mixture with fast stirring. The toluene was then added, again with stirring.

The resulting coating composition was coated at about 5 g/m² (dry basis) onto 25 g/m² Karbalto Purple tissue and volatiles were removed.

We claim:

1. A method of manufacturing a hectographic paper comprising a substrate, a generally continuous hectographic transfer layer comprising from 20 to 100 percent by weight of a dye or dye intermediate based on the non-volatile constituents of the layer disposed on the substrate and a wax-based top coating disposed in covering relationship to said layer, said method comprising:

contacting a dye or dye intermediate with a sufficient amount of a volatile solvent therefor to dissolve at least a substantial portion of the dye or dye intermediate and reduce the particle size of any undissolved dye or dye intermediate to about 10 microns or less, to produce an admixture comprising a solution of the dye or dye intermediate in the solvent and particles of any dye or dye intermediate left undissolved;

dissolving in said volatile solvent containing at least a substantial portion of the dye or dye intermediate in solution, a sufficient amount of a volatile non-solvent for the dye or dye intermediate to recrystallize a portion of the previously dissolved dye or intermediate and thereby produce a coating phase containing both dissolved dye or intermediate and recrystallized dye or intermediate;

forming a generally continuous layer of the dye or dye intermediate on a substrate by spreading said coating phase on the substrate and causing the volatile constituents to evaporate therefrom; and covering the layer with said wax-based coating.

2. A method as set forth in claim 1, wherein the layer comprises a dye selected from the group consisting of methyl violet, ethyl violet, malachite green and leuco forms thereof, said solvent being selected from the group consisting of ethyl alcohol and isopropyl alcohol and mixtures thereof with a co-solvent selected from the group consisting of water and ethylene glycol monoethyl ether.

3. A method as set forth in claim 1, wherein the layer comprises a dye selected from the group consisting of diazo dyes, and the solvent is water.

4. A method as set forth in claim 1, wherein the particle size of any undissolved dye is 2 microns or less.

5. A method set forth in claim 1, wherein the coating phase comprises 7 parts by weight of ethylhydroxyethyl-cellulose, 14 parts by weight of mineral oil, 29 parts by weight of zinc stearate, and 50 parts by weight of methyl violet, said solvent comprising methylated spirits and said non-solvent comprising toluol, there being used 80 parts by weight of solvent and 100 parts by weight of non-solvent.

6. A method as set forth in claim 1, wherein the coating phase comprises 1 part by weight of ethylhydroxyethylcellulose, 14 parts by weight of microcrystalline wax, 19 parts by weight of mineral oil, 6 parts by weight of vase-line, and 60 parts by weight of carbon black, said solvent comprising methylated spirits and said non-solvent comprising toluol, there being used 60 parts by weight of solvent and 120 parts by weight of non-solvent.

7. A method as set forth in claim 2, wherein the dye comprises methyl violet and the coating phase comprises 20 parts by weight methyl violet, 36 parts by weight isopropyl alcohol and 4 parts by weight toluol.

8. A method as set forth in claim 2 wherein the dye comprises methyl violet and the coating phase comprises 20 parts by weight methyl violet, 40 parts by weight isopropyl alcohol, 2 parts by weight water and 4 parts by weight toluol.

* * * * *